Nov. 2, 1926.
J. L. COLE
1,605,809
STUFFING BOX GLAND
Filed July 23, 1924
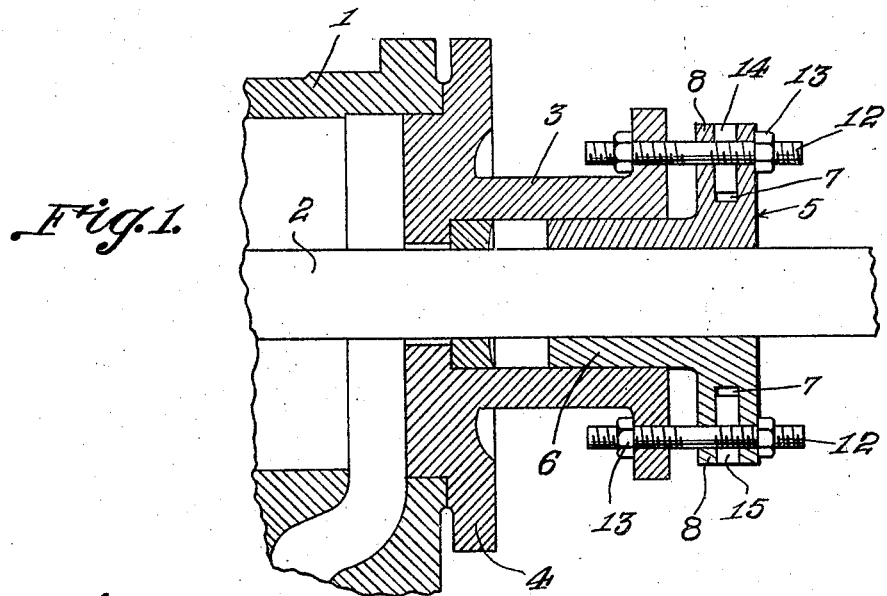
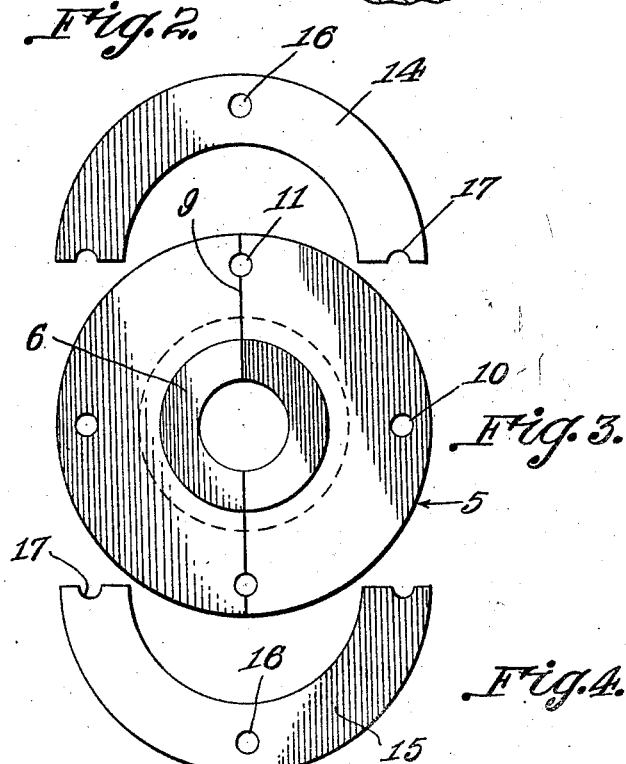
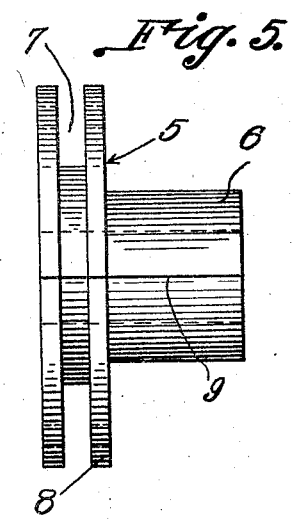
J. L. Cole, INVENTOR
WITNESS: BY Victor J. Evans, ATTORNEY Patented Nov. 2, 1926.

1,605,809

UNITED STATES PATENT OFFICE.

JACOB L. COLE, OF BRAVE, PENNSYLVANIA.

STUFFING-BOX GLAND.

Application filed July 23, 1924. Serial No. 727,793.

The object of my said invention is the provision of an efficient stuffing box gland constructed and arranged with a view to being placed in working position and removed when occasion demands with great facility.

To the attainment of the foregoing, the invention consists in the improvement as hereinafter described and definitely claimed.

In the accompanying drawings, forming part of this specification:—

Figure 1 is a sectional view illustrating the preferred embodiment of my invention in use.

Figure 2 is a view of one of the semi-annular members of my novel gland.

Figure 3 is a front elevation of the gland body.

Figure 4 is an elevation of the other semi-annular member of the gland.

Figure 5 is a side elevation of the gland body per se.

Similar numerals of reference designate corresponding parts in all of the views of the drawings.

I illustrate in Figure 1 my novel gland as associated with the cylinder 1 and the piston rod 2 of a steam engine, though I desire it understood that my novel gland is adapted for use to advantage in various applications. The cylinder 1 shown in Figure 1 is provided with the usual tubular extension 3 on its head 4.

Among other elements my novel gland comprises a body 5. This body 5 is formed in two semi-circular sections and includes a tubular extension 6 adapted to rest in the extension 3 as shown in Figure 1 and also includes the comparatively large circumferentially grooved portion 7, the said portion 7 being formed by flanges 8 in parallelism as illustrated. The sections of the body 5 are adapted to be separated on the line 9, and from this it follows that the body 5 may be readily applied in the relation shown in Figure 1 and may as readily be removed without disturbing the relation between the piston rod 2 and the head of the cylinder 1.

By reference to Figure 3 it will be noted that the flanges 8 of the body 5 are provided with apertures 10, and that the meeting edges of the flanges of the sections are provided with semi-circular shaped grooves which meet and form apertures 11. These apertures 10 and 11 are for the passage of the connecting bolts 12, Figure 1, said bolts 12 being equipped in the usual manner with nuts 13.

In addition to the body 5 my novel gland comprises the semi-annular members 14 and 15 illustrated in Figures 2 and 4, respectively, each of the said members being provided with an aperture 16 for the passage of certain of the bolts 12 and being also provided with co-acting semi-circular shaped end notches 17 adapted to fit over other of the connecting bolts. Manifestly when the sections 14 and 15 are arranged between the body flanges 8 and are connected to said body flanges by the bolts 12 a highly efficient stuffing box will be formed and one which is peculiarly advantageous because while there is no liability of the body sections being casually separated and disassociated from the members 14 and 15 because of the members 14 and 15 bridging the line of separation between the body sections, yet when the bolts 12 are removed the body sections may be separated and removed from about the piston rod and the semi-annular members 14 and 15 may likewise be disassociated from the body members and removed from opposite sides of the piston rod.

I have specifically described the preferred embodiment of my invention in order to impart an exact understanding of said embodiment. I do not desire, however, to be understood as confining myself to the said specific disclosure, however, inasmuch as my invention is defined by my appended claim within which changes may be made without departure from my invention.

Having described my invention, what I claim and desire to secure by Letters Patent, is:—

A stuffing box gland comprising a body formed of cooperating semi-circular sections, a tubular portion included in said body when the sections are associated, comparatively large spaced flanges formed on one end of said tubular portion, said flanges being formed with apertures disposed diametrically opposite each other when said sections are arranged in operative association, said flanges being further formed with matched semi-circular grooves in their ends thereof to form other apertures disposed in the same manner as the aperture first mentioned, semi-annular members adapted for arrangement between the flanges of the body and having apertures together with matched semi-circular notches in their ends, said semi-circular members being arranged so as to bridge the line of separation of the body member, nut carrying bolts having threaded ends and passing through the apertures of the flanges and semi-circular members respectively.

In testimony whereof I affix my signature.

JACOB L. COLE.